(12) United States Patent  
Hristodorescu et al.

(10) Patent No.: US 12,504,958 B2
(45) Date of Patent: Dec. 23, 2025

(54) COMPUTE ELEMENT PROCESSING USING CONTROL WORD TEMPLATES

(71) Applicant: Ascenium, Inc., Campbell, CA (US)

(72) Inventors: Ionut Hristodorescu, San Jose, CA (US); Peter Foley, Los Altos Hills, CA (US)

(73) Assignee: Ascenium, Inc., Mountain View, CA (US)

( * ) Notice: Subject to any disclaimer, the term of this patent is extended or adjusted under 35 U.S.C. 154(b) by 558 days.

(21) Appl. No.: 18/087,865

(22) Filed: Dec. 23, 2022

(65) Prior Publication Data

US 2023/0128127 A1    Apr. 27, 2023

Related U.S. Application Data

(63) Continuation-in-part of application No. 17/526,003, filed on Nov. 15, 2021, which is a
(Continued)

(51) Int. Cl.
*G06F 8/41* (2018.01)
*G06F 9/30* (2018.01)
*G06F 40/186* (2020.01)

(52) U.S. Cl.
CPC ............ *G06F 8/45* (2013.01); *G06F 9/30047* (2013.01); *G06F 40/186* (2020.01)

(58) Field of Classification Search
None
See application file for complete search history.

(56) References Cited

U.S. PATENT DOCUMENTS

| 5,594,884 A | 1/1997 | Matoba et al. |
| 5,764,994 A | 6/1998 | Craft |

(Continued)

FOREIGN PATENT DOCUMENTS

| KR | 10-2015-0051083 A | 5/2015 |
| KR | 102333845 B1 | 1/2020 |
| WO | WO2011038940 A1 | 4/2011 |

OTHER PUBLICATIONS

International Search Report dated Apr. 28, 2023 for PCT/US2022/053912.

(Continued)

*Primary Examiner* — Qing Chen
(74) *Attorney, Agent, or Firm* — Adams Intellex, PLC

(57) ABSTRACT

Techniques for task processing based on compute element processing using control word templates are disclosed. One or more control word templates are generated for use in a two-dimensional array of compute elements. Each compute element within the array is known to a compiler and is coupled to its neighboring compute elements within the array of compute elements. Each control word template designates a topological set of compute elements from the array of compute elements. The one or more control word templates are customized with a specific set of compute element operations. The one or more control word templates that were customized are stored. The specific set of compute element operations is executed on the topological set of compute elements. The one or more control word templates that were stored are reused. The one or more control word templates that were stored are modified and executed using compute elements.

24 Claims, 7 Drawing Sheets

Related U.S. Application Data continuation-in-part of application No. 17/465,949, filed on Sep. 3, 2021.

(60) Provisional application No. 63/424,961, filed on Nov. 14, 2022, provisional application No. 63/424,960, filed on Nov. 14, 2022, provisional application No. 63/402,490, filed on Aug. 31, 2022, provisional application No. 63/400,087, filed on Aug. 23, 2022, provisional application No. 63/393,989, filed on Aug. 1, 2022, provisional application No. 63/388,268, filed on Jul. 12, 2022, provisional application No. 63/357,030, filed on Jun. 30, 2022, provisional application No. 63/340,499, filed on May 11, 2022, provisional application No. 63/322,245, filed on Mar. 22, 2022, provisional application No. 63/318,413, filed on Mar. 10, 2022, provisional application No. 63/295,544, filed on Dec. 31, 2021, provisional application No. 63/254,557, filed on Oct. 12, 2021, provisional application No. 63/232,230, filed on Aug. 12, 2021, provisional application No. 63/229,466, filed on Aug. 4, 2021, provisional application No. 63/193,522, filed on May 26, 2021, provisional application No. 63/166,298, filed on Mar. 26, 2021, provisional application No. 63/125,994, filed on Dec. 16, 2020, provisional application No. 63/114,003, filed on Nov. 16, 2020, provisional application No. 63/091,947, filed on Oct. 15, 2020, provisional application No. 63/075,849, filed on Sep. 9, 2020.

(56) References Cited

U.S. PATENT DOCUMENTS

| | | |
|---|---|---|
| 7,840,777 B2 | 11/2010 | Mykland |
| 8,694,978 B1 | 4/2014 | Rus et al. |
| 8,856,768 B2 | 10/2014 | Mykland |
| 8,869,123 B2 | 10/2014 | Mykland |
| 8,949,806 B1 | 2/2015 | Lee et al. |
| 9,158,544 B2 | 10/2015 | Mykland |
| 9,304,770 B2 | 4/2016 | Mykland |
| 9,395,992 B2 | 7/2016 | Doing et al. |
| 9,424,055 B2 | 8/2016 | Lundvall et al. |
| 9,473,155 B2 | 10/2016 | Staszewski et al. |
| 9,477,470 B2 | 10/2016 | Mykland |
| 9,529,715 B2 | 12/2016 | Kumar et al. |
| 9,582,277 B2 | 2/2017 | Muff et al. |
| 9,594,559 B2 | 3/2017 | Fontenot et al. |
| 9,600,287 B2 | 3/2017 | Gschwind et al. |
| 9,633,160 B2 | 4/2017 | Mykland |
| 9,652,238 B2 | 5/2017 | Muff et al. |
| 9,684,511 B2 | 6/2017 | Shanbhogue et al. |
| 9,830,164 B2 | 11/2017 | Yazdani |
| 9,851,969 B2 | 12/2017 | Greiner et al. |
| 9,886,277 B2 | 2/2018 | Loktyukhin et al. |
| 9,898,293 B2 | 2/2018 | Whittaker |
| 9,921,836 B2 | 3/2018 | Kumar et al. |
| 9,928,062 B2 | 3/2018 | Azagury et al. |
| 9,934,040 B2 | 4/2018 | Bonanno et al. |
| 9,971,605 B2 | 5/2018 | Henry et al. |
| 9,977,674 B2 | 5/2018 | Rupley et al. |
| 9,977,675 B2 | 5/2018 | Nystad |
| 9,977,679 B2 | 5/2018 | Caulfield et al. |
| 9,983,882 B2 | 5/2018 | Greiner et al. |
| 9,983,884 B2 | 5/2018 | Maiyuran et al. |
| 10,089,152 B1 | 10/2018 | Kramer et al. |
| 10,089,277 B2 | 10/2018 | Mykland |
| 2002/0174318 A1 | 11/2002 | Studdard et al. |
| 2004/0111710 A1 | 6/2004 | Chakradhar et al. |
| 2005/0246700 A1* | 11/2005 | Archambault ........ G06F 8/4442 717/160 |
| 2009/0199169 A1* | 8/2009 | Lin .................... G06F 8/443 717/159 |
| 2013/0326190 A1 | 12/2013 | Chung et al. |
| 2014/0149657 A1 | 5/2014 | Jakovljevic et al. |
| 2014/0317383 A1 | 10/2014 | Park et al. |
| 2015/0186146 A1 | 7/2015 | Kushida et al. |
| 2016/0246602 A1 | 8/2016 | Radhika et al. |
| 2018/0225116 A1 | 8/2018 | Henry et al. |
| 2018/0307980 A1 | 10/2018 | Barik et al. |
| 2018/0322606 A1 | 11/2018 | Das et al. |
| 2018/0341493 A1 | 11/2018 | Roy et al. |
| 2019/0004777 A1 | 1/2019 | Meixner |
| 2019/0205746 A1 | 7/2019 | Nurvitadhi et al. |
| 2019/0347190 A1 | 11/2019 | Singh |
| 2019/0369990 A1 | 12/2019 | Doerr et al. |
| 2019/0392002 A1 | 12/2019 | Lavasani et al. |
| 2020/0026498 A1 | 1/2020 | Sumbul et al. |
| 2020/0134417 A1 | 4/2020 | Mohapatra et al. |
| 2020/0241879 A1 | 7/2020 | Vorbach et al. |

OTHER PUBLICATIONS

Musicus, B. R. (1988). The OKI advanced array processor (AAP): Development Software Manual.

Chang, Kyungwook, and Kiyoung Choi. "Mapping control intensive kernels onto coarse-grained reconfigurable array architecture." 2008 International SoC Design Conference. vol. 1. IEEE, 2008.

* cited by examiner

COMPUTE ELEMENT PROCESSING USING CONTROL WORD TEMPLATES

RELATED APPLICATIONS

This application claims the benefit of U.S. provisional patent applications "Compute Element Processing Using Control Word Templates" Ser. No. 63/295,544, filed Dec. 31, 2021, "Highly Parallel Processing Architecture With Out-Of-Order Resolution" Ser. No. 63/318,413, filed Mar. 10, 2022, "Autonomous Compute Element Operation Using Buffers" Ser. No. 63/322,245, filed Mar. 22, 2022, "Parallel Processing Of Multiple Loops With Loads And Stores" Ser. No. 63/340,499, filed May 11, 2022, "Parallel Processing Architecture With Split Control Word Caches" Ser. No. 63/357,030, filed Jun. 30, 2022, "Parallel Processing Architecture With Countdown Tagging" Ser. No. 63/388,268, filed Jul. 12, 2022, "Parallel Processing Architecture With Dual Load Buffers" Ser. No. 63/393,989, filed Aug. 1, 2022, "Parallel Processing Architecture With Bin Packing" Ser. No. 63/400,087, filed Aug. 23, 2022, "Parallel Processing Architecture With Memory Block Transfers" Ser. No. 63/402,490, filed Aug. 31, 2022, "Parallel Processing Using Hazard Detection And Mitigation" Ser. No. 63/424,960, filed Nov. 14, 2022, and "Parallel Processing With Switch Block Execution" Ser. No. 63/424,961, filed Nov. 14, 2022.

This application is also a continuation-in-part of U.S. patent application "Highly Parallel Processing Architecture With Compiler" Ser. No. 17/526,003, filed Nov. 15, 2021, which claims the benefit of U.S. provisional patent applications "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, "Parallel Processing Architecture For Atomic Operations" Ser. No. 63/229,466, filed Aug. 4, 2021, "Parallel Processing Architecture With Distributed Register Files" Ser. No. 63/232,230, filed Aug. 12, 2021, and "Load Latency Amelioration Using Bunch Buffers" Ser. No. 63/254,557, filed Oct. 12, 2021.

The U.S. patent application "Highly Parallel Processing Architecture With Compiler" Ser. No. 17/526,003, filed Nov. 15, 2021 is also a continuation-in-part of U.S. patent application "Highly Parallel Processing Architecture With Shallow Pipeline" Ser. No. 17/465,949, filed Sep. 3, 2021, which claims the benefit of U.S. provisional patent applications "Highly Parallel Processing Architecture With Shallow Pipeline" Ser. No. 63/075,849, filed Sep. 9, 2020, "Parallel Processing Architecture With Background Loads" Ser. No. 63/091,947, filed Oct. 15, 2020, "Highly Parallel Processing Architecture With Compiler" Ser. No. 63/114,003, filed Nov. 16, 2020, "Highly Parallel Processing Architecture Using Dual Branch Execution" Ser. No. 63/125,994, filed Dec. 16, 2020, "Parallel Processing Architecture Using Speculative Encoding" Ser. No. 63/166,298, filed Mar. 26, 2021, "Distributed Renaming Within A Statically Scheduled Array" Ser. No. 63/193,522, filed May 26, 2021, Parallel Processing Architecture For Atomic Operations" Ser. No. 63/229,466, filed Aug. 4, 2021, and "Parallel Processing Architecture With Distributed Register Files" Ser. No. 63/232,230, filed Aug. 12, 2021.

Each of the foregoing applications is hereby incorporated by reference in its entirety.

FIELD OF ART

This application relates generally to task processing and more particularly to compute element processing using control word templates.

BACKGROUND

For thousands of years, human beings have applied their ingenuity and physical labors to improving themselves and the world around them. In ancient times, large projects were accomplished using hundreds or thousands of people applying themselves to various jobs. In many cases, sophisticated engineering feats required scores of years to complete. Human power was often combined with domesticated animal power and increasingly complex building methods to create wonders such as the Great Pyramids of Egypt, the Colossus of Rhodes, and the Hanging Gardens of Babylon. As history progressed, the scale and intricacy of projects increased as well. The Great Wall of China, Angkor Wat, the Erie Canal, Machu Picchu, Stonehenge, and the Taj Mahal are just a few of the vast feats of human engineering and effort that we continue to marvel at even today. Work efforts on a large scale have been concentrated on more than just physical feats of engineering. Many successful projects are the products of years of incremental labor in varied fields of endeavor. Modern medicine started with observation, experimentation using natural elements, and deductive reasoning. Ancient Greece, China, Egypt, Israel, and Rome all contributed to our collective understanding of how the human body functions and interacts with the world around us.

The Renaissance brought with it great progress in literacy and book publication, as well as the bubonic plague, which served to motivate those in the medical community to greater study and experimentation. By the eighteenth century, scientific methodology and specialized terminology had come into being. Diagnosis (identifying the problem), prognosis (predicting the course of illness and potential cures), and prescription (choice of medications and treatments) became standard terms used by physicians to define and explain their approach to the craft. Many other fields of study have had similar courses over time. Computer science can be said to have started over two thousand years BC with the Sumerian abacus. By the fifth century BC, ancient Indian mathematicians were using a systematized and highly technical set of rules that included recursions and transformations. Mechanical calculating devices have been found dating back as far as 100 BC in the Greek islands. The medieval Islamic world developed astrolabes, torquetums, automated flutes, and programmable clocks. In the early 1700s, Leibniz developed logic into a formal, binary numeric system. Punch cards based on this binary system allowed a mechanized loom to weave cloth in 1801.

The industrial revolution led to the merging of mathematics and mechanical calculating devices into modern computer systems. Developed in the early 1800s, Charles Babbage's Analytical Engine included expandable memory, an arithmetic unit, and logic processing capabilities able to interpret a programming language with loops and conditional branching. Not long after, electrical switching circuits were applied to carry out logical operations using computer algorithms. As computer science has progressed, the ability to replicate and repeat operations and processes more and more rapidly and efficiently has led to the development of artificial intelligence, in which machine learning algorithms are used to simulate human intelligence. Such algorithms can be used in computer systems so that AI systems learn from successive iterations of tasks how to get better at performing the specified tasks, without any external intervention. As this branch of computer science progresses, our ability to move mundane, repetitive human tasks to automated systems will continue to grow, allowing humans to concentrate on more complicated and progressive endeavors.

SUMMARY

Organizations support their missions by performing vast numbers of processing jobs on modern computer systems. Any one of the processing jobs can be considered mission-critical for the organization. As a result, effective and efficient execution of the processing jobs is required. The mix of jobs that are most often processed include running payroll, billing, analyzing research data, and training a neural network for machine learning, among many others. These processing jobs are often highly complex and are based on the successful execution of many individual tasks. The processing tasks can include loading and storing datasets, accessing processing components and systems, executing data processing operations, etc. The tasks are typically assembled from subtasks which themselves can be complex. The subtasks are often used to handle specific computational jobs such as loading data from storage; performing arithmetic computations, logic evaluations, and other data manipulations tasks; storing the data back to storage; handling inter-subtask communication such as input and output data transfer and control; and so on. The datasets that are accessed are usually extensive in size and complexity. Processing of the datasets can easily overwhelm traditional processing architectures. Processing architectures, such as Von Neumann class configurations that are either poorly matched to the processing tasks or inflexible in their designs, simply cannot manage the data handing and computation tasks.

Substantial efficiency and throughput improvements to task processing can be accomplished with two-dimensional (2D) arrays of elements. The 2D arrays of elements can be configured and used for the processing of the tasks and subtasks. The 2D arrays include compute elements, multiplier elements, registers, caches, queues, register files, buffers, controllers, decompressors, arithmetic logic units (ALUs), storage elements, and other components which can communicate among themselves. These arrays of elements are configured and operated by providing control to the array of elements on a cycle-by-cycle basis. The control of the 2D array is accomplished by providing control word templates that have been customized with a specific set of compute element operations. The control word templates can be generated and customized by a compiler. The control elements can be provided as a stream of control words, where the control words can include wide microcode control words generated by the compiler. The control can include words that are based on bunches of bits. An associative memory can be included in each compute element of a topological set of compute elements, where a topological set of compute elements can include a circuit topology such as a systolic, a vector, a cyclic, a spatial, a streaming, or a Very Long Instruction Word (VLIW) topology, among others. The topologies can include a topology that enables machine learning functionality. The customization of one or more control word templates can be enabled by the associative memory. The associative memory provides a match between a control word tag, which can include a three-bit tag, and a compute element operation.

Task processing is enabled by compute element processing using control word templates. One or more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute element operations is executed on the topological set of compute elements. The one or more control word templates that were customized are stored. The one or more control word templates that were stored can be reused, modified, and executed using compute elements from the 2D array of compute elements. A temporal order is designated for operational execution. The temporal order applies to the topological set of compute elements.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
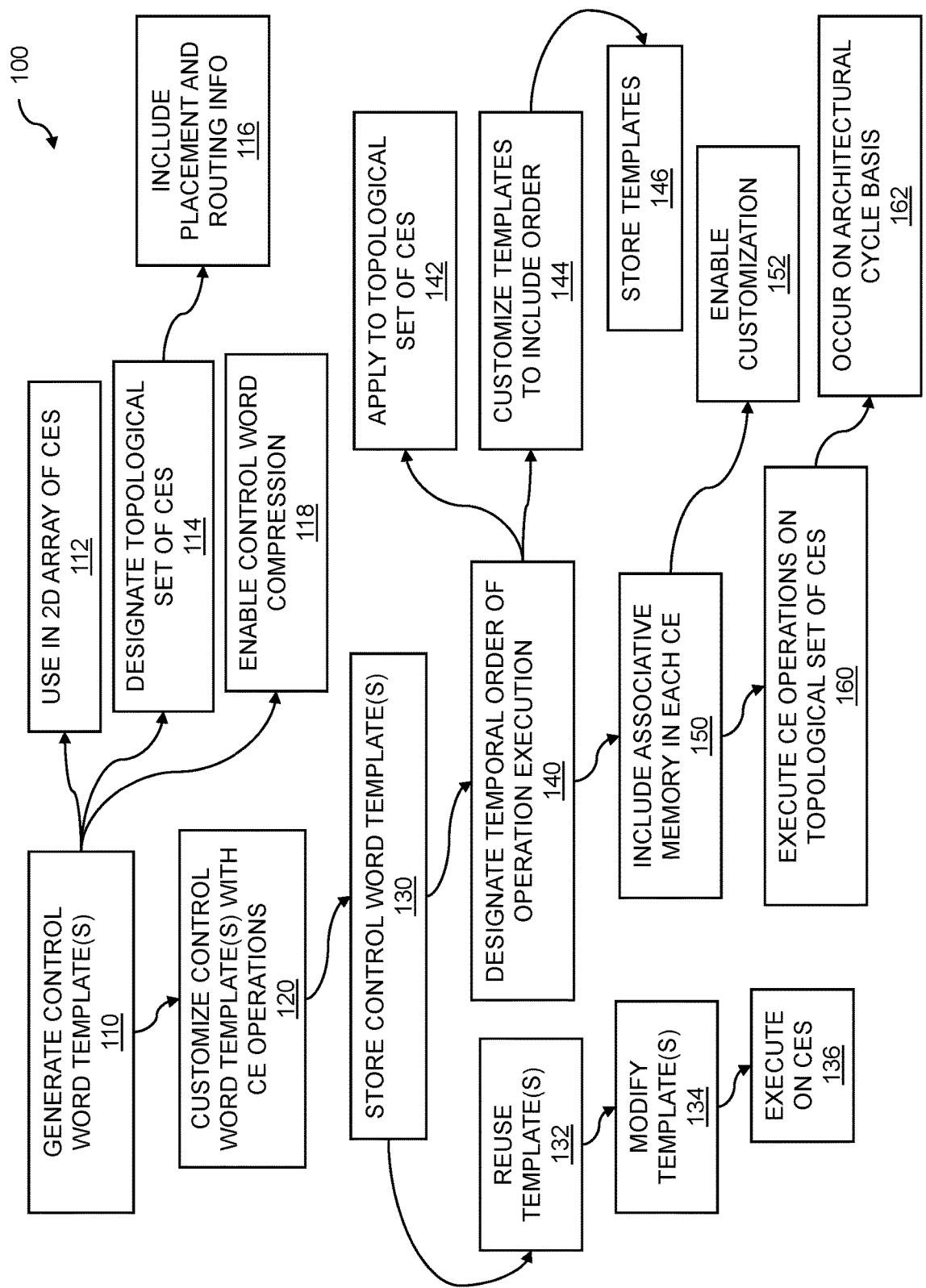
FIG. 1 is a flow diagram for compute element processing using control word templates.

Techniques for compute element processing using control word templates are disclosed. In a processing architecture such as an architecture based on configurable compute elements as described herein, the loading of data, control words, control word templates, compute element operations, and so on, can cause execution of a process, task, subtask, and the like, to stall. The stalling can cause execution of a single compute element to halt or suspend while needed data and control is obtained. In the worst case, the stalling of the compute element can result in stalling of an entire two-dimensional (2D) array of compute elements. Noted throughout, control for the array of compute elements is provided on a cycle-by-cycle basis. The control can be based on one or more control word templates, where a template can be customized with a specific set of compute element operations. The control word templates can include short words, long words, and so on. The control that is provided to the array of compute elements can be enabled by a stream of wide, control words generated by a compiler. The compiler can include a general-purpose compiler, a specialized compiler, etc. The control words comprise bits. The control word bits provide operational control for the compute element. In addition to providing control to the compute elements within the array, data can be transferred or "preloaded" into caches, registers, an associative memory, and so on prior to executing the tasks or subtasks that process the data.

The specific set of compute element operations that can customize a control word template can be loaded into one or more of caches, storage elements, registers, etc. The registers can be based on a memory element with two read ports and one write port (2R1 W). The 2R1 W memory element enables two read operations and one write operation to occur substantially simultaneously. An associative memory can be included in each compute element of the topological set of compute elements. The associative memory can be based on a 2R1 W register, where the 2R1 W register can be distributed throughout the array. The specific sets of instructions associated with control word templates can be written to an associative memory associated with each compute element within the 2D array of compute elements. The specific sets of instructions can configure the compute elements, enable the compute elements to execute operations within the array, and so on. The control word templates can designate a topological set of compute elements from the 2D array of compute elements. The designating a topological set of compute elements can include placement and routing information for the compute elements and other elements within the 2D array of compute elements. The specific set of compute element operations associated with the control word templates can include a number of operations that can accomplish some or all of the operations associated with a task, a subtask, and so on. By providing a sufficient number of operations, autonomous operation of the compute element can be accomplished. The autonomous operation of the compute element can be based on operational looping, where the operational looping is enabled without additional control word template loading. Recall that latency associated with access by a compute element to storage can be significant and can cause the compute element to stall. By performing operations without additional loading of control word templates, load latency can be eliminated, thus expediting the execution of operations.

Tasks and subtasks that are executed by the compute elements within the array of compute elements can be associated with a wide range of applications. The applications can be based on data manipulation, such as image or audio processing applications, facial recognition voice recognition, AI applications, business applications, data processing and analysis, and so on. The tasks that are executed can perform a variety of operations including arithmetic operations, shift or rotate operations, logical operations including Boolean operations, vector or matrix operations, tensor operations, and the like. The subtasks can be executed based on precedence, priority, coding order, amount of parallelization, data flow, data availability, compute element availability, communication channel availability, and so on.

The data manipulations are performed on a two-dimensional (2D) array of compute elements (CEs). The compute elements within the 2D array can be implemented with central processing units (CPUs), graphics processing units (GPUs), application specific integrated circuits (ASICs), field programmable gate arrays (FPGAs), processing cores, or other processing components or combinations of processing components. The compute elements can include heterogeneous processors, homogeneous processors, processor cores within an integrated circuit or chip, etc. The compute elements can be coupled to local storage, which can include local memory elements, register files, cache storage, associative memories, etc. The cache, which can include a hierarchical cache such as an L1, L2, and L3 cache, can be used for storing data such as intermediate results, compressed control words, coalesced control words, decompressed control words, relevant portions of a control word, and the like. The cache can store data produced by a taken branch path, where the taken branch path is determined by a branch decision. The decompressed control word is used to control one or more compute elements within the array of compute elements. Multiple layers of the two-dimensional (2D) array of compute elements can be "stacked" to comprise a three-dimensional array of compute elements.

The tasks, subtasks, etc., that are associated with processing operations are generated by a compiler. The compiler can include a general-purpose compiler, a hardware description-based compiler, a compiler written or "tuned" for the array of compute elements, a constraint-based compiler, a satisfiability-based compiler (SAT solver), and so on. Control is provided to the hardware in the form of control words, where one or more control words are generated by the compiler. The control words are provided to the array on a cycle-by-cycle basis. The control words can include wide, variable length, microcode control words. The length of a microcode control word can be adjusted by compressing the control word. The compressing can be accomplished by recognizing situations where a compute element is unneeded by a task. Thus, control bits within the control word associated with the unneeded compute elements are not required for that compute element. Other compression techniques can also be applied. The control words can be used to route data, to set up operations to be performed by the compute elements, to idle individual compute elements or rows and/or columns of compute elements, etc. Noting that the compiled microcode control words that are generated by the compiler are based on bits, the control words can be compressed by selecting bits from the control words. The control of the compute elements can be accomplished by a control unit.

Compute element processing using control word templates enables task processing. The task processing can include data manipulation. One or more control word templates are generated for use in a two-dimensional (2D) array of compute elements. The compute elements can include compute elements, processors, or cores within an integrated circuit; processors or cores within an application specific integrated circuit (ASIC); cores programmed within a programmable device such as a field programmable gate array (FPGA), and so on. The compute elements can include homogeneous or heterogeneous processors. Each compute element within the array of compute elements is known to a compiler. The compiler, which can include a general-purpose compiler, a hardware-oriented compiler, or a compiler specific to the compute elements, can compile code for each of the compute elements. Each compute element is coupled to its neighboring compute elements within the 2D array of compute elements. The coupling of the compute elements enables data communication between and among compute elements. Thus, the compiler can control data flow between and among the compute elements and can also control data commitment to memory outside of the array. Each control word template designates a topological set of compute elements from the 2D array of compute elements. The topological set of compute elements can implement a circuit topology. The topology that can be implemented can include one or more of a systolic, a vector, a cyclic, a spatial, a streaming, or a Very Long Instruction Word (VLIW) topology. The compute elements can further include a topology suited to machine learning functionality.

The array of compute elements is controlled on a cycle-by-cycle basis, wherein the controlling is enabled by a stream of wide control words generated by the compiler. A cycle can include a clock cycle, an architectural cycle, a system cycle, etc. The architectural cycle basis reflects non-wall clock, compiler time. The stream of wide control words generated by the compiler provides direct, fine-grained control of the 2D array of compute elements. The fine-grained control can include control of individual compute elements, memory elements, control elements, etc. One or more control word templates can be customized with a specific set of compute element operations. The compute element operations can enable specific arithmetic, logical, matrix, tensor, neural network, or other operations. The one or more customized control word templates can be loaded into associative memories. The associative memories are each coupled to a compute element within the array of compute elements. An associative memory can be coupled to one or more compute elements within the array. A specific set of compute element operations used to customize the control word template provides operational control for the compute element. The set of compute element operations can enable autonomous compute element operation. The autonomous operation can include operational looping within the compute elements. The operational looping can be enabled without additional control word loading.

FIG. 1 is a flow diagram for compute element processing using control word templates. Groupings of compute elements (CEs), such as CEs assembled within a 2D array of CEs, can be configured to execute a variety of operations associated with data processing. The operations can be based on tasks and on subtasks, where the subtasks are associated with the tasks. The 2D array can further interface with other elements such as controllers, storage elements, ALUs, memory management units (MMUs), GPUs, multiplier elements, and so on. The operations can accomplish a variety of processing objectives such as application processing, data manipulation, data analysis, and so on. The operations can manipulate a variety of data types including integer, real, and character data types; vectors and matrices; tensors; etc. In embodiments, the compute element operations can include arithmetic logic unit (ALU) operations. Control is provided to the array of compute elements on a cycle-by-cycle basis, where the control is enabled by a stream of wide control words generated by the compiler. The control words, which can include microcode control words, enable or idle various compute elements; provide data; route results between or among CEs, caches, and storage; and the like. The control enables compute element operation, memory access precedence, etc. Compute element operation and memory access precedence enable the hardware to properly sequence data provision and compute element results. The control enables execution of a compiled program on the array of compute elements.

The flow 100 includes generating 110 one or more control word templates. The templates can be generated for a type of operation, a class, a task, a subtask, and so on. The templates can represent an arithmetic or logical operation, a matrix operation, a tensor operation, etc. The templates can represent a topology such as a circuit topology (discussed shortly below). The control word templates can include one or more control words. In the flow 100, the one or more control word templates are generated for use in a two-dimensional (2D) array 112 of compute elements. Each compute element within the array of compute elements is known to a compiler and is coupled to its neighboring compute elements within the 2D array of compute elements. The compiler can include a general-purpose compiler such as a C, C++, or Python™ compiler, a special purpose compiler such as a hardware description language compiler, and the like. The compiler can generate control words that can be used within the control word templates. In embodiments, the control word templates can include wide control words generated by the compiler. The compiler can generate compressed control words, where the compressed control words can reduce the overhead associated with loading control words into the 2D array of compute elements.

The compute elements associated with the 2D array of compute elements can be based on a variety of types of processors. The compute elements or CEs can include central processing units (CPUs), graphics processing units (GPUs), processors or processing cores within application specific integrated circuits (ASICs), processing cores programmed within field programmable gate arrays (FPGAs), and so on. In embodiments, compute elements within the array of compute elements have identical functionality. The compute elements can include heterogeneous compute resources, where the heterogeneous compute resources may or may not be collocated within a single integrated circuit or chip. In the flow 100, each control word template designates 114 a topological set of compute elements from the 2D array of compute elements. A topological set of compute elements can include one or more compute elements, where the topological set can represent a topology such as a circuit topology. A circuit topology can describe the structure of a circuit without expressing details about a specific circuit. In a usage example, a topology can describe a circuit that can perform addition without including exact details about the numbers of bits the circuit can add, the fabrication technology on which the circuit is based, and so on. The topology can be used to abstract the adder circuit to a functional level of abstraction as opposed to an electrical level. The topology can be built into the 2D array, programmed or configured within the array, etc.

The compute elements within the 2D array of compute elements can be coupled to other elements within the array. In embodiments, the coupling of the compute elements can enable one or more further topologies. The other elements to which the CEs can be coupled can include storage elements such as one or more levels of cache storage; control units; multiplier units; address generator units for generating load (LD) and store (ST) addresses; queues; register files; and so on. The coupling of each CE to its neighboring CEs enables clustering of compute resources; sharing of elements such as cache elements, multiplier elements, ALU elements, or control elements; communication between or among neighboring CEs; and the like. The topological set of compute elements can be associated with various topologies. In embodiments, the topology can include one or more of a systolic, a vector, a cyclic, a spatial, a streaming, or a Very Long Instruction Word (VLIW) topology. The topology can include neural network functionality. In the flow 100, the designating a topological set of compute elements includes placement and routing 116 information. The placement and routing information can include placing or assigning tasks and subtasks to compute elements, configuring the interconnections between the compute elements, and so on. The interconnections between compute elements can direct data and control to and from compute elements. In the flow 100, the control word templates enable program memory control word compression 118. Control word compression enables reduced storage requirements for the one or more control word templates. In addition, the compressed control words can be communicated more quickly to compute elements, storage elements, etc. within the 2D array. The quicker control word communication is accomplished since the compressed control words are smaller than the control words, and therefore can be transferred faster.

The flow 100 includes customizing 120 the one or more control word templates. The control word templates are customized with a specific set of compute element operations. The compute element operations can be controlled by one or more control words. Recall that a control word can include a wide control word, and that control words can be generated by the compiler. The control word template can serve simply as a template into which compiled control words can be placed, as a guide, as a framework, and so on, for performing operations on one or more of the compute elements within the 2D array. The control word template can be customized to handle varying amounts of data to be processed; adapted for data types such as integer, real, floating point, character, matrix, or unstructured data, etc. Customizing a control word template can include repeating a control word template for a variety of purposes such as enabling parallel execution of a task, subtask, etc.

The flow 100 further includes storing 130 the one or more control word templates that were customized. The one or more control word templates can be stored within storage elements. The storage elements can include one or more register files; cache storage such as L1, L2, and L3 cache storage; storage shared by one or more compute elements; storage within the 2D array; storage coupled to the 2D array; remote storage; etc. The storing can be accomplished at the time the control word templates are generated, customized, modified, and the like. The storing can be accomplished using one or more background operations. The flow 100 further includes reusing 132 the one or more control word templates that were stored. The reusing can include using the template for an additional task or subtask, customizing two or more control word templates to enable parallel execution of tasks or processing operations on multiple datasets, and the like. The reusing can include using the template "as is", further customizing the template, etc. The flow 100 further includes modifying 134 the one or more control word templates that were stored, based on an arithmetic logic unit (ALU) operation. The ALU can perform a variety of operations including arithmetic operations such as addition, subtraction, multiplication, and division; logical operations such as AND, NAND, OR, NOR, XOR, XNOR, NOT, shift, and rotate; etc. The modifying the control word template can be based on data type, data size, precision, and the like. The flow 100 further includes executing 136 the one or more control word templates that were modified, using compute elements from the 2D array of compute elements. The executing can be based on processing the control words within the control word template, where the control word template can include a template that was generated, customized, reused, modified, etc.

The flow 100 includes designating a temporal order 140 for operational execution. The temporal order can be based on a priority for tasks and subtasks; a precedence for tasks and subtasks, data dependencies (e.g., a second task processes results from a first task), and so on. The temporal order can be based on arithmetic precedence, logical precedence, etc. In the flow 100, the temporal order applies to the topological set 142 of compute elements. Recall that each control word template designates a topological set of compute elements from the 2D array of compute elements. In a usage example, a topological set of compute elements can represent a graph such as a directed acyclic graph (DAG). The temporal order can control execution of the DAG such that tasks, subtasks, etc., are executed in the order or orders specified by the DAG. Such temporal order can ensure that the data presented to a node within the DAG is valid and ready for processing. The flow 100 further includes customizing 144 the one or more control word templates to include the temporal order that was designated. The customizing the control word templates can include ordering control words, modifying control words, adding or removing control words, and the like. The flow 100 further includes storing 146 the one or more control word templates for future use. The storing of the templates for future use can reduce compile time, expedite deployment of control word templates, etc. As for other control word templates discussed previously and throughout, embodiments can include reusing the one or more control word templates that were stored. The stored templates can be reused for repeated tasks, tasks that occur periodically, and so on. Embodiments can further include modifying the one or more control word templates that were stored, based on an arithmetic logic unit operation. The modifying can adjust for data types, mixed data types (e.g., adding an integer for a real number), and the like. Further embodiments can include executing the one or more control word templates that were modified, using compute elements from the 2D array of compute elements (discussed below).

The flow 100 further comprises including an associative memory 150 in each compute element of the topological set of compute elements. An associative memory, also known as a content addressable memory (CAM), differs in operation from a random-access memory (RAM). For a RAM, an address is provided that is used to access a location or address within the RAM. The contents of the memory at the address are returned. For a CAM, data is provided instead of an address. The data is compared to the contents of the CAM. For each instance of the data being present within the CAM, an address is returned by the CAM. In the flow 100, the customizing is enabled 152 by the associative memory. The contents of the CAM can include one or more control words, compressed control words, decompressed control words, etc. In embodiments, the associative memory can provide a match between a control word tag and a compute element operation. The control word tag can include one or more bits. The control word tag can be used to access control words for a single compute element, a plurality of compute elements, and so on. In embodiments, the control word tag can include a three-bit tag. Other numbers of bits such as two bits, four bits, etc., can be associated with the control word tag.

The flow 100 includes executing 160 the specific set of compute element operations on the topological set of compute elements. The operations can include arithmetic operations, logical operations, matrix operations, tensor operations, and so on. The operations that are executed are contained in the control words associated with the control word template. Discussed above, the control words can include a stream of wide control words generated by the compiler. The control words can be used to control the array of compute elements on a cycle-by-cycle basis. A cycle can include a local clock cycle, a self-timed cycle, a system cycle, and the like. In the flow 100, the executing occurs on an architectural cycle 162 basis. An architectural cycle can include a read-modify-write cycle. In embodiments, the architectural cycle basis reflects non-wall clock, compiler time. The execution can include distributed execution of operations. In embodiments, the distributed execution of operations can occur in two or more compute elements within the array of compute elements. The compute elements can include independent compute elements, clustered compute elements, etc. Execution of specific compute element operations can enable parallel operation processing. The parallel operation processing can include processing nodes of a graph that are independent of each other, processing independent tasks and subtasks, etc. The operations can include arithmetic, logic, array, matrix, tensor, and other operations. A given compute element can be enabled for operation execution, idled for a number of cycles when the compute element is not needed, etc. The operations that are executed can be repeated. An operation can be based on a plurality of control words.

The operation that is being executed can include data dependent operations. In embodiments, the plurality of control words includes two or more data dependent branch operations. The branch operation can include two or more branches where a branch is selected based on an operation such as an arithmetic or logical operation. In a usage example, a branch operation can determine the outcome of an expression such as A>B. If A is greater than B, then one branch can be taken. If A is less than or equal to B, then another branch can be taken. In order to expedite execution of a branch operation, sides of the branch can be precomputed prior to datum A and datum B being available. When the data are available, the expression can be computed, and the proper branch direction can be chosen. The untaken branch data and operations can be discarded, flushed, etc. In embodiments, the two or more data dependent branch operations can require a balanced number of execution cycles. The balanced number of execution cycles can reduce or eliminate idle cycles, stalling, and the like. In embodiments, the balanced number of execution cycles is determined by the compiler. In embodiments, the generating, the customizing, and the executing can enable background memory accesses. The background memory access can enable a control element to access memory independently of other compute elements, a controller, etc. In embodiments, the background memory accesses can reduce load latency. Load latency is reduced since a compute element can access memory before the compute element exhausts the data that the compute element is processing.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
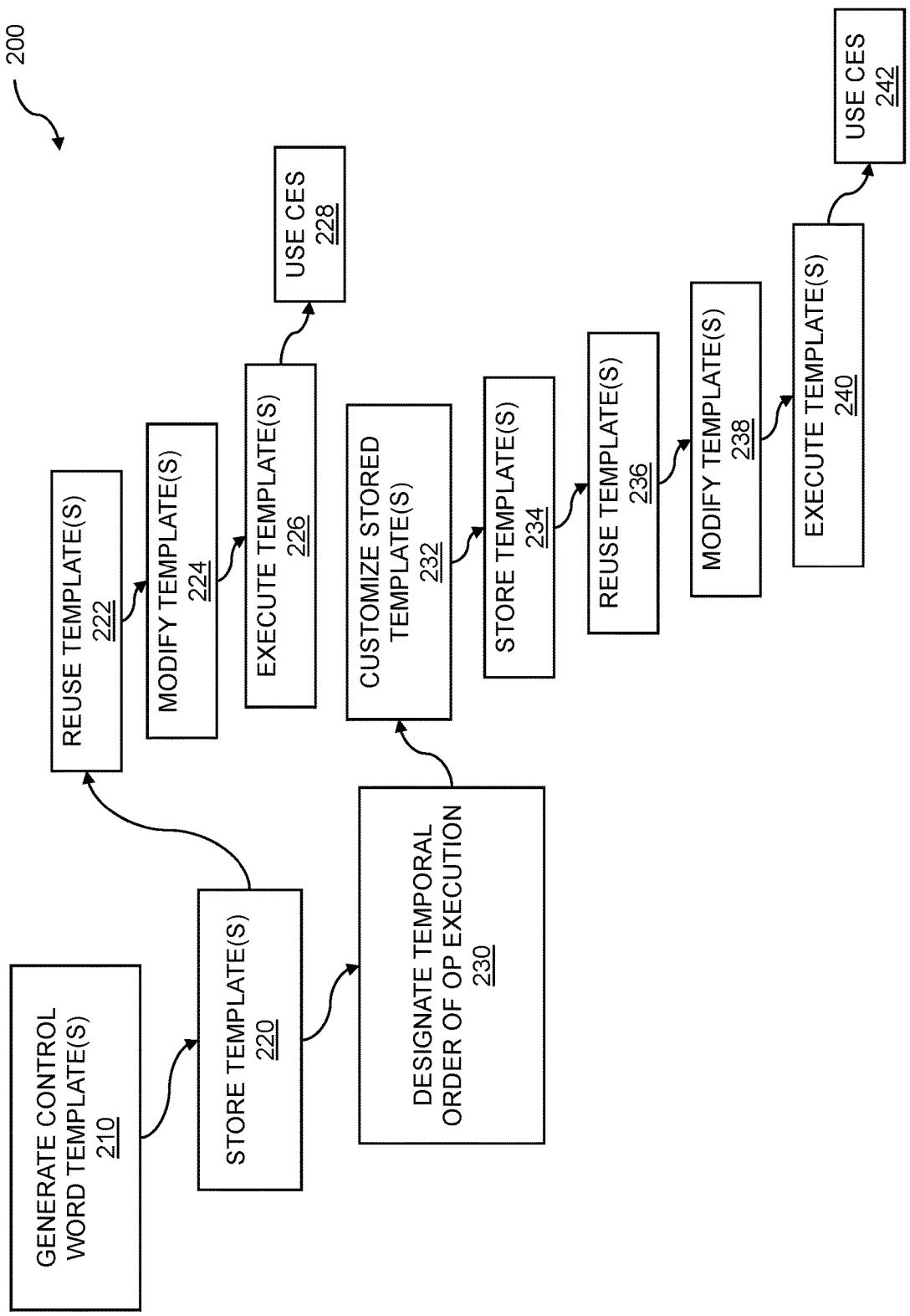
FIG. 2 is a flow diagram for template handling.

FIG. 2 is a flow diagram for template handling. Control word templates, which can include specific sets of compute element operations, can be generated for task processing. The task processing is accomplished by executing the specific set or sets of compute element instructions on a topological set of compute elements, where the compute elements can include elements within a two-dimensional array. The compute element templates are used for compute element processing. Collections, clusters, or groupings of compute elements (CEs), such as CEs assembled within a 2D array of CEs, can be configured to execute a variety of operations associated with programs, codes, apps, and so on. The operations can be based on tasks, and subtasks that are associated with the tasks. The 2D array can further interface with other elements such as controllers, storage elements, ALUs, MMUs, GPUs, multiplier elements, convolvers, and the like. The operations can accomplish a variety of processing objectives such as application processing, data manipulation, design and simulation, and so on. The operations can perform manipulations of a variety of data types including integer, real, floating point, and character data types; vectors and matrices; tensors; etc. One or more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute element operations is executed on the topological set of compute elements.

One or more control word templates can be stored in one or more associative memories. An associative memory can be included with each compute element. By using the control word templates, a controller configures array elements such as compute elements, and enables execution of a compiled program on the array. The compute elements can access registers, scratchpads, caches, and so on, that contain control words, data, etc. The compute elements can further be designated in a topological set of compute elements (CEs). The topological set of CEs can implement one or more topologies, where a topology can be mapped by the compiler. The topology mapped by the compiler can include a graph such as a directed graph (DG) or directed acyclic graph (DAG), a Petri Net (PN), etc. In embodiments, the compiler maps machine learning functionality to the array of compute elements. The machine learning can be based on supervised, unsupervised, and semi-supervised learning; deep learning (DL); and the like. In embodiments, the machine learning functionality can include a neural network implementation. The compute elements can be coupled to other elements within the array of CEs. In embodiments, the coupling of the compute elements can enable one or more topologies. The other elements to which the CEs can be coupled can include storage elements such as one or more levels of cache storage, multiplier units, address generator units for generating load (LD) and store (ST) addresses, queues, and so on. The compiler to which each compute element is known can include a C, C++, or Python compiler. The compiler to which each compute element is known can include a compiler written especially for the array of compute elements. The coupling of each CE to its neighboring CEs enables sharing of elements such as cache elements, multiplier elements, ALU elements, or control elements; communication between or among neighboring CEs; and the like.

The flow 200 includes generating one or more control word templates 210. The control word templates are generated for use in a two-dimensional (2D) array of compute elements. Discussed above and throughout, each compute element within the array of compute elements can be known to a compiler and can be coupled to its neighboring compute elements within the 2D array of compute elements. The compiler can include a high-level compiler, a hardware description language compiler, and so on. In embodiments, each control word template designates a topological set of compute elements from the 2D array of compute elements. The topological set of compute elements can implement a circuit or architectural topology. The one or more control word templates can be customized with a specific set of compute element operations. The compute element operations can include arithmetic logic operations such as those operations performed by an arithmetic logic unit (ALU).

The flow 200 includes storing 220 the one or more control word templates that were customized. The control word templates can be stored within storage coupled to a compute element, storage shared by two or more compute elements, storage coupled to the 2D array of compute elements remote storage, and so on. In embodiments, the storage can include associative memory, where the associative memory can be included in each compute element of the topological set of compute elements. The flow 200 includes reusing 222 the one or more control word templates that were stored. The reusing can include using a customized control word template "as is" for a task, subtask, and so on that is substantially similar to the task for which the control word template was originally generated. The reusing can include using multiple copies of a control word template. The flow 200 includes modifying 224 the one or more control word templates that were stored, based on an arithmetic logic unit (ALU) operation. An ALU operation can include an arithmetic operation such as addition or subtraction, a logical operation such as AND or shift, and so on. The modifying can include changing values, locations, or pointers associated with an augend and one or more addends; location, destination, or target for a sum; and so on. The flow 200 includes executing 226 the one or more control word templates that were modified. The executing can be accomplished by providing the compute element operations to the compute elements within the 2D array. The providing can be accomplished by loading the compute element operations into a cache, providing a pointer to the compute element operations, etc. The flow 200 includes using compute elements 228 from the 2D array of compute elements. The compute elements that are used can include compute elements within a designated topological set of compute elements.

The flow 200 includes designating a temporal order 230 for operational execution. The temporal order can be based on a precedence, or a priority, associated with a specific set of compute element operations, a task, a subtask, and so on. The temporal order can be based on data availability. In embodiments, the temporal order can apply to the topological set of compute elements. A topological set of compute elements can be associated with each control word template. The flow 200 includes customizing 232 the one or more control word templates to include the temporal order that was designated. The customizing can include ordering compute element operations, updating pointers, changing orders for loading control words, etc. The flow 200 includes storing 234 the one or more control word templates for future use. The storing can include loading the one or more control word templates into a cache, into an associative memory, into storage associated with a compute element, into storage accessible to two or more compute elements, into centralized storage, etc. The flow 200 includes reusing 236 the one or more control word templates that were stored. The reusing can include using multiple copies of a control word template that was stored, using multiple copies of the stored template, and so on. The flow 100 includes modifying 238 the one or more control word templates that were stored, based on an arithmetic logic unit operation. The modifying can be based on changing operations being performed or to be performed by the ALU. The modifying can include changing compute element operations within a specific set of operations; changing storage addresses or pointer values to data, etc. The flow 200 includes executing 240 the one or more control word templates that were modified. The executing can include executing control words, decompressing control words for executing, accessing data, processing data, storing data, and the like. In the flow 200, the executing can be accomplished using compute elements 242 from the 2D array of compute elements. The compute elements can include compute elements within the 2D array of compute elements. The compute elements can further include using additional components such as a matrix or vector engine, an arithmetic logic unit, a memory management unit, a multiplier, a high-speed adder, etc.

Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
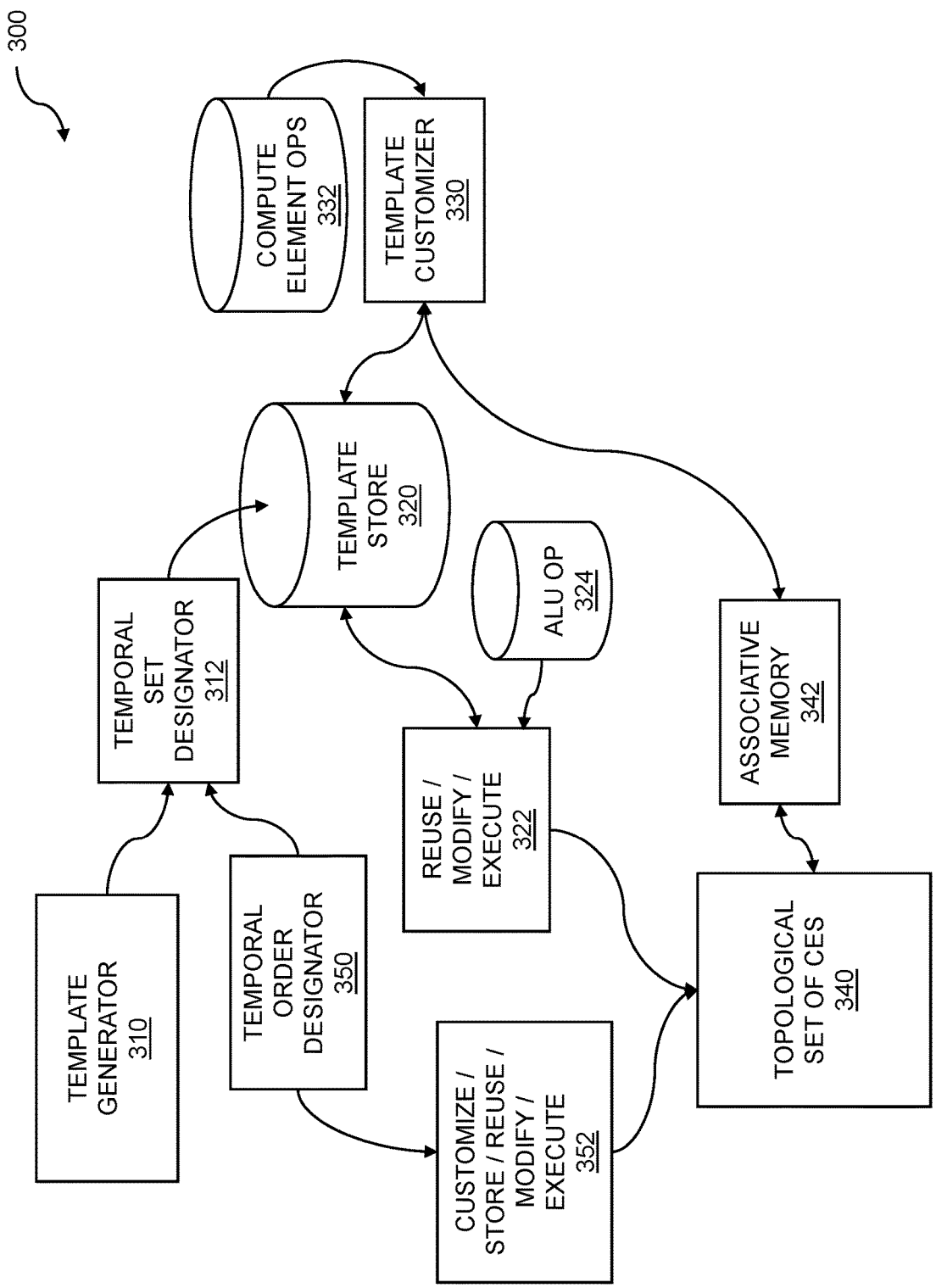
FIG. 3 is a system block diagram for template handling.

FIG. 3 is a system block diagram for template handling. A template, such as a control word template, can be generated and customized for execution in a two-dimensional (2D) array of compute elements. The template can be customized with a specific set of compute element operations. The specific set of compute element operations can be executed on a topological set of compute elements. The template can be used to configure the array of compute elements to perform a variety of operations such as arithmetic, logical, matrix, and tensor operations. The array of compute elements can be configured to perform higher level processing operations such as video processing and audio processing operations. The array can be further configured for machine learning functionality, where the machine learning functionality can include a neural network implementation. The one or more compute elements can be configured for compute element processing using control word templates. One or more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute elements operates on the topological set of compute elements. The customized control word templates can be stored, reused, modified, and executed.

The system block diagram 300 can include a template generator 310. Each compute element within the array is known to a compiler and is coupled to its neighboring compute elements within the 2D array of compute elements. The template generator can be based on an assembler, a compiler, and so on. The compiler can include a high-level compiler such as a C, C++, Python, or similar compiler. The compiler can include a hardware description language compiler such as a VHDL™ or Verilog™ compiler. The compiler can include a compiler for a portable, language-independent, intermediate representation such as low-level virtual machine (LLVM) intermediate representation (IR). The compiler can generate a set of control word templates, where the control word templates can represent a circuit topology. A circuit topology can include a systolic, a vector, a cyclic, a spatial, a streaming, or a Very Long Instruction Word (VLIW) topology, a neural network topology, etc. The compiler can be used to compile tasks, subtasks, and so on. The tasks and subtasks can be based on a processing application. The compiler can generate directions for handling compute element results. The compute element results can include results derived from arithmetic, vector, array, and matrix operations; Boolean operations; and so on. The system block diagram 300 includes a temporal set designator 312. The temporal set designator uses each control word template to designate a topological set of compute elements from the 2D array of compute elements. A topological set of compute elements can implement a circuit topology such as the topologies just discussed. The topological set can include compute elements, multiplier elements, storage elements, arithmetic logic units, etc.

The system block diagram 300 can include template store 320. The one or more control word templates that are generated can be stored in one or more storage elements. The storage elements can include one or more register files, cache memories, shared storage, remote storage, and so on. The template storage can be accessible to one or more compute elements. The template storage can store the generated templates, templates uploaded by a user, templates downloaded from a library of templates, and the like. The system block diagram 300 can include a reuse, modify, execute block 322. Embodiments include reusing the one or more control word templates that were stored. The reuse of the one or more control word templates can include using multiple copies of a template, one or more templates, etc. Embodiments include modifying the one or more control word templates that were stored, based on an arithmetic logic unit 324 operation. The modifying can include modifying a template to handle a number of arithmetic or logical operations; to process various quantities of data; to perform operations for a data precision, number representation such as twos complement, real, or floating point, or a word size; and the like. Embodiments further include executing the one or more control word templates that were modified, using compute elements from the 2D array of compute elements. The use of the compute elements within the array for execution can enable sequential operation, parallel operation, threading and multithreading operation, etc.

The system block diagram can include a template customizer 330. The template customizer can customize the one or more control word templates with a specific set of compute element operations. In the system block diagram 300, the compute element operations can be obtained from a compute element operations store 332. The compute element operations store can include control words, weights, biases, parameters, etc. In a usage example, a control word template can include a template for convolution. The customization of the control word template can include providing compute element operations based on coefficients, word sizes, precisions, and the like. The system block diagram 300 can include a topological set of compute elements 340 from the 2D array of compute elements. The topological set of compute elements can represent a circuit, system, process, or application topology. Discussed above and throughout, a circuit topology can include a systolic, a vector, a cyclic, a spatial, a streaming, or a Very Long Instruction Word (VLIW) topology, a neural network topology, or some other topology. The system block diagram 300 can include an associative memory 342. Embodiments can comprise including an associative memory in each compute element of the topological set of compute elements. The associative memory can be used to determine whether a given datum is present within the memory. In embodiments, the customizing of the one or more control word templates is enabled by the associative memory. The associative memory can enable rapid location of compute element operations to be executed by the compute elements. In embodiments, the associative memory can provide a match between a control word tag and a compute element operation. A control word tag can comprise a number of bits. In embodiments, the control word tag comprises a three-bit tag. The tag can include other numbers of tag bits such as two bits, four bits, and so on.

The system block diagram 300 can include a temporal order designator 350. The temporal order designator can designate a temporal order for operational execution. A temporal order for operational execution can be based on an order of operation; arithmetic precedence, such as exponents, multiplication, division, addition, subtraction; temporal precedence such as task A before task B; data dependencies; etc. The temporal order can be applied to execution by one or more compute elements within the 2D array of compute elements. In embodiments, the temporal order can apply to the topological set of compute elements. The system block diagram 300 can include a customize, store, reuse, modify, and execute block 352. The block 352 can manipulate on one or more control word templates for temporal purposes. Embodiments include customizing the one or more control word templates to include the temporal order that was designated. The customizing can include adding or removing control words, ordering control words to enable task precedence or priority, etc. Embodiments further include storing the one or more control word templates for future use. The one or more control word templates can be customized to the template store 320, to cache, to local storage, and the like. Other embodiments include reusing the one or more control word templates that were stored. Reuse of the one or more control word templates can include using the templates "as is", using multiple copies of the templates, etc. The reuse can include using the control word templates for further tasks, subtasks, and the like. Further embodiments include modifying the one or more control word templates that were stored, based on an arithmetic logic unit operation. The modifications can be based on arithmetic and logical operations such as addition, AND, shift, etc. Further embodiments include executing the one or more control word templates that were modified, using compute elements from the 2D array of compute elements. The executing can be accomplished by providing control words associated with the control word templates, loading or accessing data to be processed, and so on.

Figure 4:
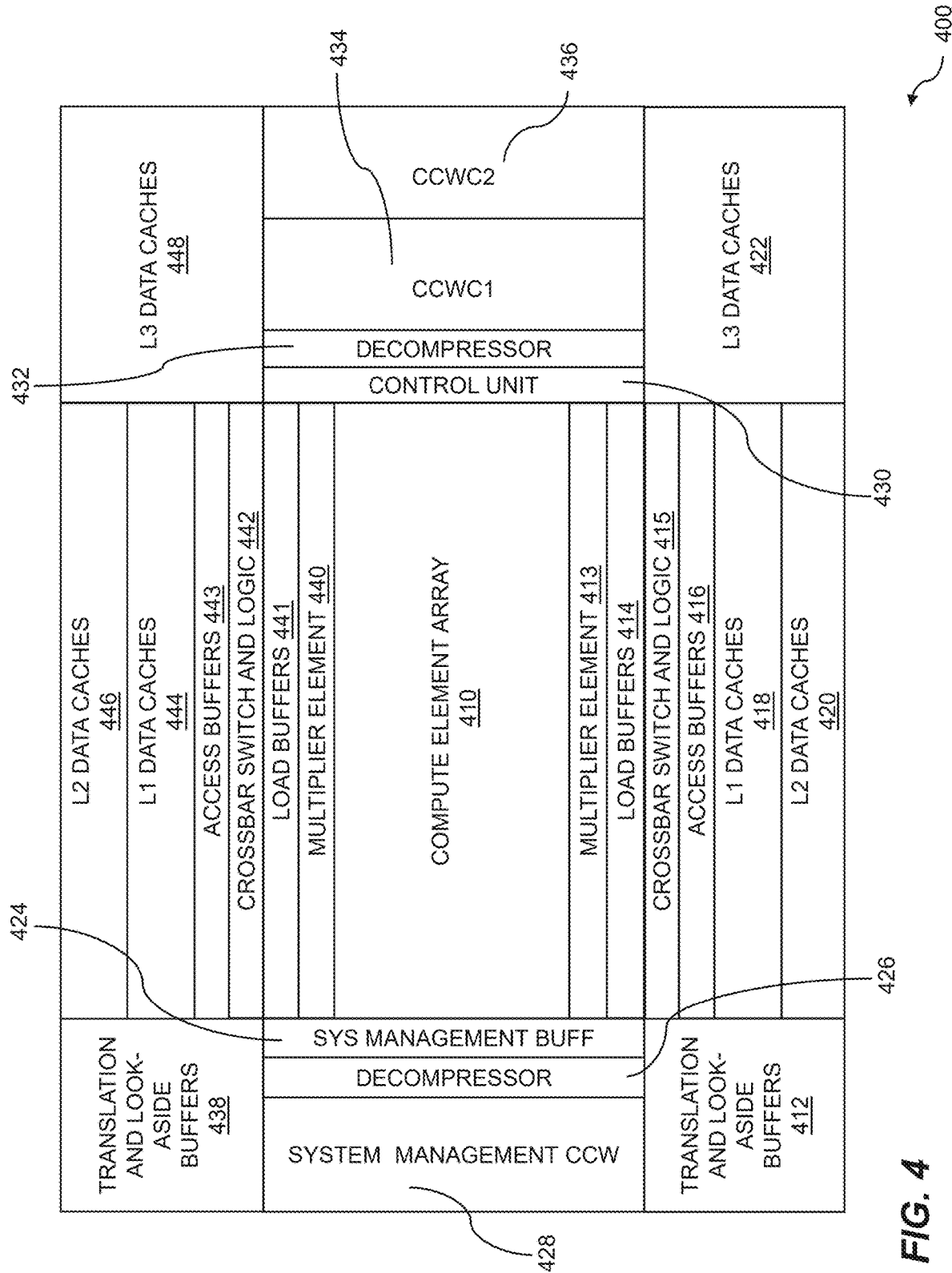
FIG. 4 illustrates a system block diagram for a highly parallel architecture with a shallow pipeline.

FIG. 4 illustrates a system block diagram for a highly parallel architecture with a shallow pipeline. The highly parallel architecture can comprise components including compute elements, processing elements, buffers, one or more levels of cache storage, system management, arithmetic logic units, multipliers, memory management units, and so on. The various components can be used to accomplish task processing, where the task processing is associated with program execution, job processing, etc. The task processing is enabled based on compute element processing using control word templates. One more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute element operations is executed on the topological set of compute elements.

A two-dimensional (2D) array of compute elements is accessed, wherein each compute element within the array of compute elements is known to a compiler and is coupled to its neighboring compute elements within the array of compute elements. Control for the array of compute elements is provided on a cycle-by-cycle basis, wherein the control is enabled by a stream of wide control words generated by the compiler. A plurality of sets of control word bits is loaded into buffers, wherein the buffers are each coupled to a compute element within the array of compute elements, and wherein the sets of control word bits provide operational control for the compute element. Operations are executed within the array of compute elements, wherein the operations are based on a selected set of control word bits.

A system block diagram 400 for a highly parallel architecture with a shallow pipeline is shown. The system block diagram can include a compute element array 410. The compute element array 410 can be based on compute elements, where the compute elements can include processors, central processing units (CPUs), graphics processing units (GPUs), coprocessors, and so on. The compute elements can be based on processing cores configured within chips such as application specific integrated circuits (ASICs), processing cores programmed into programmable chips such as field programmable gate arrays (FPGAs), and so on. The compute elements can comprise a homogeneous array of compute elements. The system block diagram 400 can include translation and look-aside buffers such as translation and look-aside buffers 412 and 438. The translation and look-aside buffers can comprise memory caches, where the memory caches can be used to reduce storage access times.

The system block diagram 400 can include logic for load and store access order and selection. The logic for load and store access order and selection can include crossbar switch and logic 415 along with crossbar switch and logic 442. Crossbar switch and logic 415 can accomplish load and store access order and selection for the lower data cache blocks (418 and 420), and crossbar switch and logic 442 can accomplish load and store access order and selection for the upper data cache blocks (444 and 446). Crossbar switch and logic 415 enables high-speed data communication between the lower-half compute elements of compute element array 410 and data caches 418 and 420 using access buffers 416. Crossbar switch and logic 442 enables high-speed data communication between the upper-half compute elements of compute element array 410 and data caches 444 and 446 using access buffers 443. The access buffers 416 and 443 allow logic 415 and logic 442, respectively, to hold load or store data until any memory hazards are resolved. In addition, splitting the data cache between physically adjacent regions of the compute element array can enable the doubling of load access bandwidth, the reducing of interconnect complexity, and so on. While loads can be split, stores can be driven to both lower data caches 418 and 420 and upper data caches 444 and 446.

The system block diagram 400 can include lower load buffers 414 and upper load buffers 441. The load buffers can provide temporary storage for memory load data so that it is ready for low latency access by the compute element array 410. The system block diagram can include dual level 1 (L1) data caches, such as L1 data caches 418 and 444. The L1 data caches can be used to hold blocks of load and/or store data, such as data to be processed together, data to be processed sequentially, and so on. The L1 cache can include a small, fast memory that is quickly accessible by the compute elements and other components. The system block diagram can include level 2 (L2) data caches. The L2 caches can include L2 caches 420 and 446. The L2 caches can include larger, slower storage in comparison to the L1 caches. The L2 caches can store "next up" data, results such as intermediate results, and so on. The L1 and L2 caches can further be coupled to level 3 (L3) caches. The L3 caches can include L3 caches 422 and 448. The L3 caches can be larger than the L2 and L1 caches and can include slower storage. Accessing data from L3 caches is still faster than accessing main storage. In embodiments, the L1, L2, and L3 caches can include 4-way set associative caches.

The system block diagram 400 can include lower multiplier element 413 and upper multiplier element 440. The multiplier elements can provide an efficient multiplication function of data coming out of the compute element array and/or data moving into the compute element array. Multiplier element 413 can be coupled to the compute element array 410 and load buffers 414, and multiplier element 440 can be coupled to compute element array 410 and load buffers 441.

The system block diagram 400 can include a system management buffer 424. The system management buffer can be used to store system management codes or control words that can be used to control the array 410 of compute elements. The system management buffer can be employed for holding opcodes, codes, routines, functions, etc. which can be used for exception or error handling, management of the parallel architecture for processing tasks, and so on. The system management buffer can be coupled to a decompressor 426. The decompressor can be used to decompress system management compressed control words (CCWs) from system management compressed control word buffer 428 and can store the decompressed system management control words in the system management buffer 424. The compressed system management control words can require less storage than the uncompressed control words. The system management CCW component 428 can also include a spill buffer. The spill buffer can comprise a large static random-access memory (SRAM) which can be used to support multiple nested levels of exceptions.

The compute elements within the array of compute elements can be controlled by a control unit such as control unit 430. While the compiler, through the control word, controls the individual elements, the control unit can pause the array to ensure that new control words are not driven into the array. The control unit can receive a decompressed control word from a decompressor 432 and can drive out the decompressed control word into the appropriate compute elements of compute element array 410. The decompressor can decompress a control word (discussed below) to enable or idle rows or columns of compute elements, to enable or idle individual compute elements, to transmit control words to individual compute elements, etc. The decompressor can be coupled to a compressed control word store such as compressed control word cache 1 (CCWC1) 434. CCWC1 can include a cache such as an L1 cache that includes one or more compressed control words. CCWC1 can be coupled to a further compressed control word store such as compressed control word cache 2 (CCWC2) 436. CCWC2 can be used as an L2 cache for compressed control words. CCWC2 can be larger and slower than CCWC1. In embodiments, CCWC1 and CCWC2 can include 4-way set associativity. In embodiments, the CCWC1 cache can contain decompressed control words, in which case it could be designated as DCWC1. In that case, decompressor 432 can be coupled between CCWC1 434 (now DCWC1) and CCWC2 436.

Figure 5:
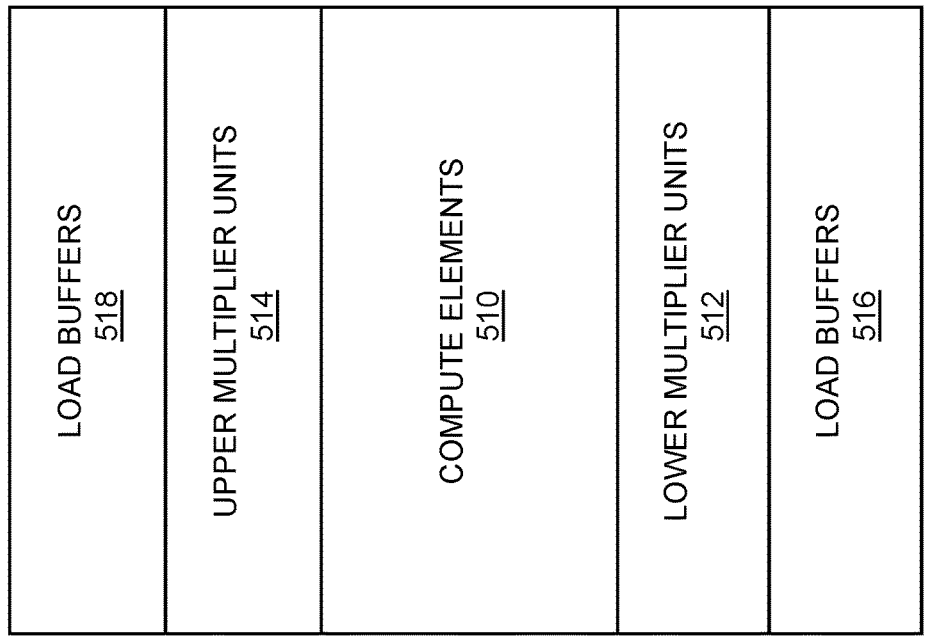
FIG. 5 shows compute element array detail.

FIG. 5 shows compute element array detail 500. A compute element array can be coupled to components which enable the compute elements within the array to process one or more tasks, subtasks, and so on. The components can access and provide data, perform specific high-speed operations, and the like. The compute element array and its associated components enable processing using control word templates. The compute element array 510 can perform a variety of processing tasks, where the processing tasks can include operations such as arithmetic, vector, matrix, or tensor operations; audio and video processing operations; neural network operations; etc. The compute elements can be coupled to multiplier units such as lower multiplier units 512 and upper multiplier units 514. The multiplier units can be used to perform high-speed multiplications associated with general processing tasks, multiplications associated with neural networks such as deep learning networks, multiplications associated with vector operations, and the like. The compute elements can be coupled to load buffers such as load buffers 516 and load buffers 518. The load buffers can be coupled to the L1 data caches as discussed previously. In embodiments, a crossbar switch (not shown) can be coupled between the load buffers and the data caches. The load buffers can be used to load storage access requests from the compute elements. The load buffers can track expected load latencies and can notify a control unit if a load latency exceeds a threshold. Notification of the control unit can be used to signal that a load may not arrive within an expected timeframe. The load buffers can further be used to pause the array of compute elements. The load buffers can send a pause request to the control unit that will pause the entire array, while individual elements can be idled under control of the control word. When an element is not explicitly controlled, it can be placed in the idle (or low power) state. No operation is performed, but ring buses can continue to operate in a "pass thru" mode to allow the rest of the array to operate properly. When a compute element is used just to route data unchanged through its ALU, it is still considered active.

While the array of compute elements is paused, background loading of the array from the memories (data memory and control word memory) can be performed. The memory systems can be free running and can continue to operate while the array is paused. Because multi-cycle latency can occur due to control signal transport that results in additional "dead time", allowing the memory system to "reach into" the array and to deliver load data to appropriate scratchpad memories can be beneficial while the array is paused. This mechanism can operate such that the array state is known, as far as the compiler is concerned. When array operation resumes after a pause, new load data will have arrived at a scratchpad, as required for the compiler to maintain the statically scheduled model.

Figure 6:
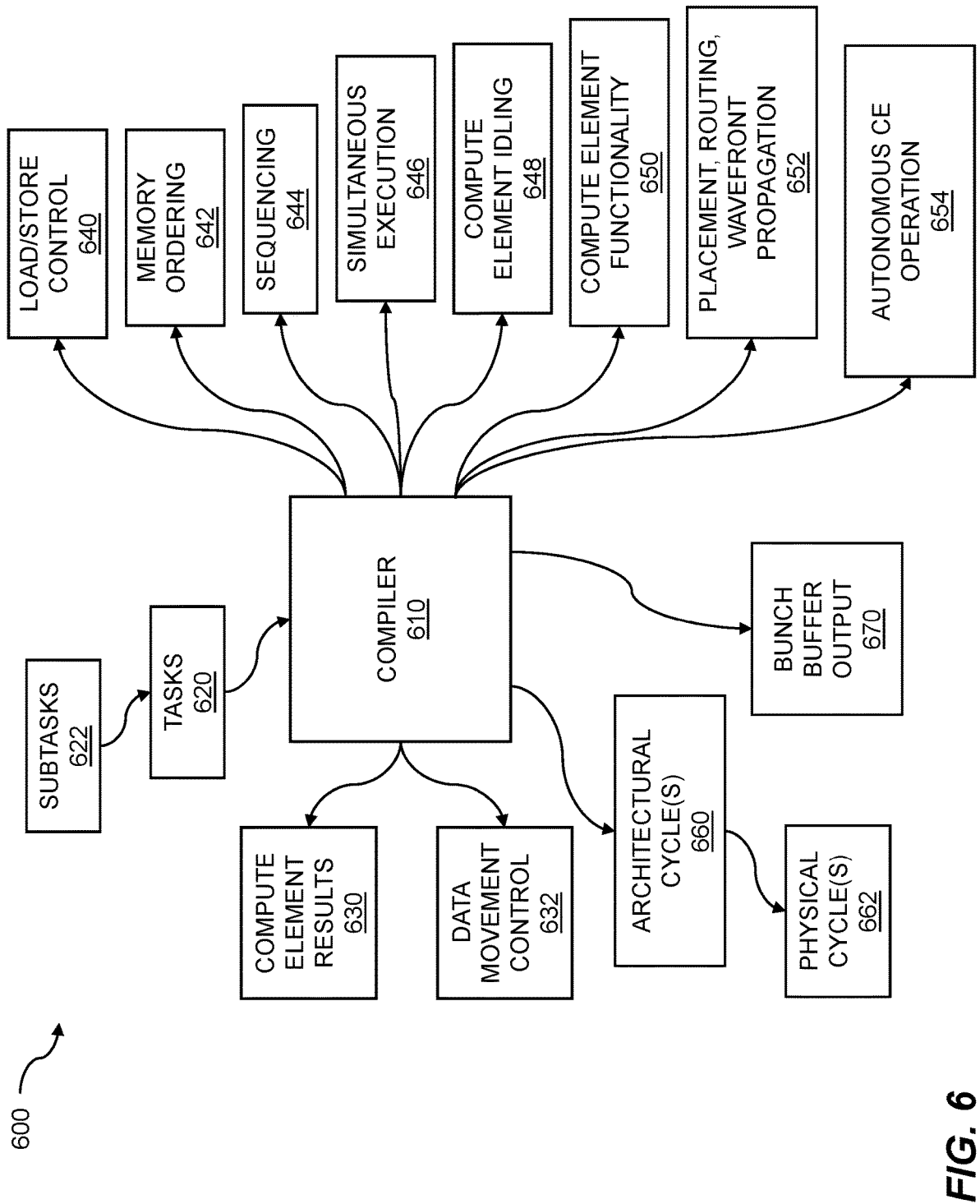
FIG. 6 illustrates a system block diagram for compiler interactions.

FIG. 6 illustrates a system block diagram for compiler interactions. Discussed throughout, compute elements within a 2D array are known to a compiler which can compile tasks and subtasks for execution on the array. The compiled tasks and subtasks are executed on one or more compute elements to accomplish task processing. A variety of interactions, such as configuration of compute elements, placement of tasks, routing of data, and so on, can be associated with the compiler. The compiler interactions enable compute element processing using control word templates. One or more control word templates are generated for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements. The one or more control word templates are customized with a specific set of compute element operations. The specific set of compute element operations is executed on the topological set of compute elements.

The system block diagram 600 includes a compiler 610. The compiler can include a high-level compiler such as a C, C++, Python, or similar compiler. The compiler can include a compiler implemented for a hardware description language such as a VHDL™ or Verilog™ compiler. The compiler can include a compiler for a portable, language-independent, intermediate representation such as low-level virtual machine (LLVM) intermediate representation (IR). The compiler can generate a set of directions that can be provided to the computer elements and other elements within the array. The compiler can be used to compile tasks 620. The tasks can include a plurality of tasks associated with a processing task. The tasks can further include a plurality of subtasks 622. The tasks can be based on an application such as a video processing or audio processing application. In embodiments, the tasks can be associated with machine learning functionality. The compiler can generate directions for handling compute element results 630. The compute element results can include results derived from arithmetic, vector, array, and matrix operations; Boolean operations; and so on. In embodiments, the compute element results are generated in parallel in the array of compute elements. Parallel results can be generated by compute elements, where the compute elements can share input data, use independent data, and the like. The compiler can generate a set of directions that controls data movement 632 for the array of compute elements. The control of data movement can include movement of data to, from, and among compute elements within the array of compute elements. The control of data movement can include loading and storing data, such as temporary data storage, during data movement. In other embodiments, the data movement can include intra-array data movement.

As with a general-purpose compiler used for generating tasks and subtasks for execution on one or more processors, the compiler 610 can provide directions for task and subtask handling, input data handling, intermediate and result data handling, and so on. The directions can include one or more operations, where the one or more operations can be executed by one or more compute elements within the array of compute elements. The compiler can further generate directions for configuring the compute elements, storage elements, control units, ALUs, and so on, associated with the array. As previously discussed, the compiler generates directions for data handling to support the task handling. In the system block diagram, the data movement can include loads and stores 640 with a memory array. The loads and stores can include handling various data types such as integer, real or float, double-precision, character, and other data types. The loads and stores can load and store data into local storage such as registers, register files, caches, and the like. The caches can include one or more levels of cache such as a level 1 (L1) cache, a level 2 (L2) cache, a level 3 (L3) cache, and so on. The loads and stores can also be associated with storage such as shared memory, distributed memory, etc. In addition to the loads and stores, the compiler can handle other memory and storage management operations including memory precedence. In the system block diagram, the memory access precedence can enable ordering of memory data 642. Memory data can be ordered based on task data requirements, subtask data requirements, and so on. The memory data ordering can enable parallel execution of tasks and subtasks.

In the system block diagram 600, the ordering of memory data can enable compute element result sequencing 644. In order for task processing to be accomplished successfully, tasks and subtasks must be executed in an order that can accommodate task priority, task precedence, a schedule of operations, and so on. The memory data can be ordered such that the data required by the tasks and subtasks can be available for processing when the tasks and subtasks are scheduled to be executed. The results of the processing of the data by the tasks and subtasks can therefore be ordered to optimize task execution, to reduce or eliminate memory contention conflicts, etc. The system block diagram includes enabling simultaneous execution 646 of two or more potential compiled task outcomes based on the set of directions. The code that is compiled by the compiler can include branch points, where the branch points can include computations or flow control. Flow control transfers program execution to a different sequence of control words. Since the result of a branch decision, for example, is not known a priori, the initial operations associated with both paths are encoded in the currently executing control word stream. When the correct result of the branch is determined, then the sequence of control words associated with the correct branch result continues execution, while the operations for the branch path not taken are halted and side effects may be flushed. In embodiments, the two or more potential branch paths can be executed on spatially separate compute elements within the array of compute elements.

The system block diagram includes compute element idling 648. In embodiments, the set of directions from the compiler can idle an unneeded compute element within a row of compute elements located in the array of compute elements. Not all of the compute elements may be needed for processing, depending on the tasks, subtasks, and so on that are being processed. The compute elements may not be needed simply because there are fewer tasks to execute than there are compute elements available within the array. In embodiments, the idling can be controlled by a single bit in the control word generated by the compiler. In the system block diagram, compute elements within the array can be configured for various compute element functionalities 650. The compute element functionality can enable various types of compute architectures, processing configurations, and the like. In embodiments, the set of directions can enable machine learning functionality. The machine learning functionality can be trained to process various types of data such as image data, audio data, medical data, etc. In embodiments, the machine learning functionality can include a neural network implementation. The neural network can include a convolutional neural network, a recurrent neural network, a deep learning network, and the like. The system block diagram can include compute element placement, results routing, and computation wave-front propagation 652 within the array of compute elements. The compiler can generate directions that can place tasks and subtasks on compute elements within the array. The placement can include placing tasks and subtasks based on data dependencies between or among the tasks or subtasks, placing tasks that avoid memory conflicts or communications conflicts, etc. The directions can also enable computation wave-front propagation. Computation wave-front propagation can implement and control how execution of tasks and subtasks proceeds through the array of compute elements. The system block diagram 600 can include autonomous compute element (CE) operation 654. Autonomous CE operation enables one or more operations to occur outside of direct control word management.

In the system block diagram, the compiler can control architectural cycles 660. An architectural cycle can include an abstract cycle that is associated with the elements within the array of elements. The elements of the array can include compute elements, storage elements, control elements, ALUs, and so on. An architectural cycle can include an "abstract" cycle, where an abstract cycle can refer to a variety of architecture level operations such as a load cycle, an execute cycle, a write cycle, and so on. The architectural cycles can refer to macro-operations of the architecture rather than to low level operations. One or more architectural cycles are controlled by the compiler. Execution of an architectural cycle can be dependent on two or more conditions. In embodiments, an architectural cycle can occur when a control word is available to be pipelined into the array of compute elements and when all data dependencies are met. That is, the array of compute elements does not have to wait for either dependent data to load or for a full memory buffer to clear. In the system block diagram, the architectural cycle can include one or more physical cycles 662. A physical cycle can refer to one or more cycles at the element level required to implement a load, an execute, a write, and so on. In embodiments, the set of directions can control the array of compute elements on a physical cycle-by-cycle basis. The physical cycles can be based on a clock such as a local, module, or system clock, or some other timing or synchronizing technique. In embodiments, the physical cycle-by-cycle basis can include an architectural cycle. The physical cycles can be based on an enable signal for each element of the array of elements, while the architectural cycle can be based on a global architectural signal. In embodiments, the compiler can provide, via the control word, valid bits for each column of the array of compute elements, on the cycle-by-cycle basis. A valid bit can indicate that data is valid and ready for processing, that an address such as a jump address is valid, and the like. In embodiments, the valid bits can indicate that a valid memory load access is emerging from the array. The valid memory load access from the array can be used to access data within a memory or storage element. In other embodiments, the compiler can provide, via the control word, operand size information for each column of the array of compute elements. Various operand sizes can be used. In embodiments, the operand size can include bytes, half-words, words, and doublewords.

Discussed above and throughout, the control word bits comprise a control word bunch. A control word bunch can include a subset of bits in a control word. In embodiments, the control word bunch can provide operational control of a particular compute element, a multiplier unit, and so on. Buffers, or "bunch buffers" can be placed at each control element. In embodiments, the bunch buffers can hold a number of bunches such as 16 bunches. Other numbers of bunches such as 8, 32, 64 bunches, and so on, can also be used. In the system block diagram 600, the compiler can control bunch buffer output 670. The output of a bunch buffer associated with a compute element, multiplier element, etc., can control the associated compute element or multiplier element. In embodiments, an iteration counter can be associated with each bunch buffer. The interaction counter can be used to control a number of times that the bits within the bunch buffer are cycled through. In further embodiments, a bunch buffer pointer can be associated with each bunch buffer. The bunch buffer counter can be used to indicate or "point to" the next bunch of control word bits to apply to the compute element or multiplier element. In embodiments, data paths associated with the bunch buffers can be balanced during a compile time associated with processing tasks, subtasks, and so on. The balancing the data paths can enable compute elements to operate without the risk of a single compute element being starved for data, which could result in stalling the two-dimensional array of compute elements as data is obtained for the compute element. Further, the balancing the data paths can enable an autonomous operation technique. In embodiments, the autonomous operation technique can include a dataflow technique.

Figure 7:
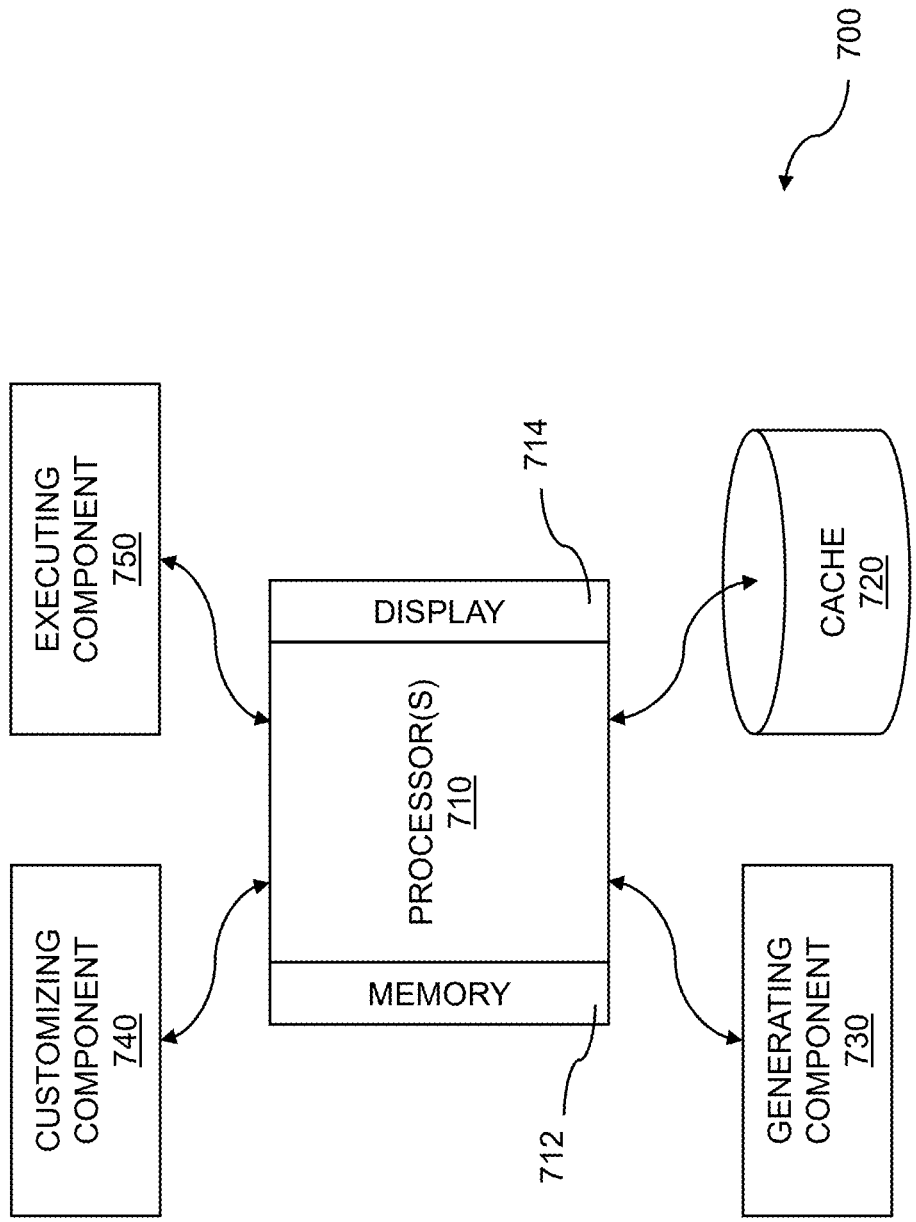
FIG. 7 is a system diagram for compute element processing using control word templates.

FIG. 7 is a system diagram for compute element processing using control word templates. The compute element processing using control word templates accomplishes task processing. The system 700 can include one or more processors 710, which are attached to a memory 712 which stores instructions. The system 700 can further include a display 714 coupled to the one or more processors 710 for displaying data; intermediate steps; directions; control words; control word templates; customized control word templates; compressed control words; control words implementing Very Long Instruction Word (VLIW) functionality; topologies including systolic, vector, cyclic, spatial, streaming, or VLIW topologies; and so on. In embodiments, one or more processors 710 are coupled to the memory 712, wherein the one or more processors, when executing the instructions which are stored, are configured to: generate one or more control word templates for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements; customize the one or more control word templates with a specific set of compute element operations; and execute the specific set of compute element operations on the topological set of compute elements. The compute elements can include compute elements within one or more integrated circuits or chips, compute elements or cores configured within one or more programmable chips such as application specific integrated circuits (ASICs), field programmable gate arrays (FPGAs), heterogeneous processors configured as a mesh, standalone processors, etc.

The system 700 can include a cache 720. The cache 720 can be used to store data such as scratchpad data, operations that support a balanced number of execution cycles for a data-dependent branch, directions to compute elements, control words, control word templates that are customized with a specific set of compute element operations, intermediate results, microcode, branch decisions, and so on. The cache can comprise a small, local, easily accessible memory available to one or more compute elements. In embodiments, the data that is stored can include preloaded data that can enable load latency amelioration. The data within the cache can include data required to support dataflow processing by statically scheduled compute elements within the 2D array of compute elements. The cache can be accessed by one or more compute elements. The cache, if present, can include a dual read, single write (2R1 W) cache. That is, the 2R1 W cache can enable two read operations and one write operation contemporaneously without the read and write operations interfering with one another.

The system 700 can include a generating component 730. The generating component 730 can include control logic and functions for generating one or more control word templates for use in a two-dimensional (2D) array of compute elements. Each compute element within the array of compute elements is known to a compiler and is coupled to its neighboring compute elements within the 2D array of compute elements. Each control word template designates a topological set of compute elements from the 2D array of compute elements. A compute element can include one or more processors, processor cores, processor macros, processor cells, and so on. Each compute element can include an amount of local storage. The local storage may be accessible by one or more compute elements. Each compute element can communicate with neighbors, where the neighbors can include nearest neighbors or more remote "neighbors". Communication between and among compute elements can be accomplished using a bus such as an industry standard bus, a ring bus, a network such as a wired or wireless computer network, etc. In embodiments, the ring bus is implemented as a distributed multiplexor (MUX). A topological set of compute elements can include a subset of compute elements within the 2D array of compute elements. The topological set can include a set of interconnections between the set of compute elements. A topology can be implemented to perform specific tasks or operations. In embodiments, the topologies implemented within the array of compute elements by the topological sets can include a systolic, a vector, a cyclic, a spatial, a streaming, or a Very Long Instruction Word (VLIW) topology. Other topologies can include a neural network topology. A control can enable machine learning functionality for the neural network topology.

The system 700 can include a customizing component 740. The customizing component 740 can include control and functions for customizing the one or more control word templates with a specific set of compute element operations. Discussed above and throughout, a control word template can describe a topological set of compute elements. The topological set of compute elements can include compute elements arranged to perform operations that enable systolic, vector, cyclic, spatial, and streaming processing, operations based on a VLIW instructions (e.g., command words), and the like. The customizing can include adapting control word templates to a specific application, associating a plurality of templates for serial operations, configuring templates for parallel operations, and so on. In a usage example, a topological set of compute elements can implement a neural network topology. The customization of the neural network topology can include assigning functions to rows of nodes within the neural network. The functions can include convolution, activation based on a rectified linear unit (ReLU), and so on. The customization can be accomplished by assigning weights and biases to nodes within the neural network topology.

In embodiments, an associative memory is included in each compute element of the topological set of compute elements. The associative memory can include a small, fast memory, a register file, etc. In embodiments, the customizing can be enabled by the associative memory. The associative memory can store customized control word templates. The customized control word templates can be used to provide control for the array of compute elements on a cycle-by-cycle basis. The control words can be based on low-level control words such as assembly language words, microcode words, and so on. The control can be based on bits, where control word bits comprise a control word bunch. The control of the array of compute elements on a cycle-by-cycle basis can include configuring the array to perform various compute operations. In embodiments, the control word templates can comprise wide, variable length, control words generated by the compiler. In embodiments, a stream of wide, variable length, control words generated by the compiler can provide direct, fine-grained control of the 2D array of compute elements. The compute operations can enable audio or video processing, artificial intelligence processing, machine learning, deep learning, and the like. The providing control can be based on microcode control words, where the microcode control words can include opcode fields, data fields, compute array configuration fields, etc. The compiler that generates the control can include a general-purpose compiler, a parallelizing compiler, a compiler optimized for the array of compute elements, a compiler specialized to perform one or more processing tasks, and so on. The providing control can implement one or more topologies such as processing topologies within the array of compute elements. In embodiments, the topologies implemented within the array of compute elements can include a systolic, a vector, a cyclic, a spatial, a streaming, or a Very Long Instruction Word (VLIW) topology. Other topologies can include a neural network topology. A control can enable machine learning functionality for the neural network topology.

The system block diagram 700 can include an executing component 750. The executing component 750 can include control and functions for executing the specific set of compute element operations on the topological set of compute elements. The compute element operations that are executed can include task processing operations, subtask processing operations, and so on. The operations associated with tasks, subtasks, and so on can include arithmetic operations, Boolean operations, matrix operations, neural network operations, and the like. The operations can be executed based on the specific set of compute element operations associated with the one or more customized control word templates. The specific set of compute element operations can be generated by the compiler. The control words can be provided to a control unit where the control unit can control the operations of the compute elements within the array of compute elements. Operation of the compute elements can include configuring the compute elements, providing data to the compute elements, routing and ordering results from the compute elements, and so on. In embodiments, the specific set of compute element operations associated with control words can be executed on a given cycle across the array of compute elements. The set of compute element operations can provide control to the topological set of compute elements on a per compute element basis, where each control word can be comprised of a plurality of compute element control groups, clusters, and so on.

The executing operations contained in one or more specific sets of compute element operations can include distributed execution of operations. In embodiments, the distributed execution of operations can occur in two or more compute elements within the array of compute elements. The executing operations can include storage access, where the storage can include a scratchpad memory, one or more caches, register files, etc., within the 2D array of compute elements. Further embodiments include a memory operation outside of the array of compute elements. The "outside" memory operation can include access to a memory such as a high-speed memory, a shared memory, remote memory, etc. In embodiments, the memory operation can be enabled by autonomous compute element operation. Data operations can be performed by a topological set of compute elements without loading further control words for a number of cycles. The autonomous compute element operation can be based on operation looping. In embodiments, the operation looping can accomplish dataflow processing within statically scheduled compute elements. Dataflow processing can include processing based on the presence or absence of data. The dataflow processing can be performed without requiring access to external storage. Discussed above and throughout, the executing can occur on an architectural cycle basis. An architectural basis can include a compute element cycle. In embodiments, the architectural cycle basis can reflect non-wall clock, compiler time.

The system 700 can include a computer program product embodied in a non-transitory computer readable medium for task processing, the computer program product comprising code which causes one or more processors to perform operations of: generating one or more control word templates for use in a two-dimensional (2D) array of compute elements, wherein each compute element within the array of compute elements is known to a compiler and is coupled to its neighboring compute elements within the 2D array of compute elements, and wherein each control word template designates a topological set of compute elements from the 2D array of compute elements; customizing the one or more control word templates with a specific set of compute element operations; and executing the specific set of compute element operations on the topological set of compute elements.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for task processing comprising:

generating one or more control word templates for use in a two-dimensional (2D) array of compute elements, wherein each compute element within the 2D array of compute elements is known to a compiler and is coupled to neighboring compute elements of the compute element within the 2D array of compute elements, wherein tasks that are associated with processing operations are generated by the compiler, and wherein each control word template of the one or more control word templates designates a topological set of compute elements from the 2D array of compute elements;

customizing the one or more control word templates with a specific set of compute element operations that provide operational control for each compute element within the 2D array of compute elements; and executing the specific set of compute element operations associated with the one or more control word templates on the topological set of compute elements from the 2D array of compute elements to process the tasks.

2. The processor-implemented method of claim 1 further comprising storing the one or more control word templates that were customized.

3. The processor-implemented method of claim 2 further comprising reusing the one or more control word templates that were stored.

4. The processor-implemented method of claim 3 further comprising modifying the one or more control word templates that were stored, based on an arithmetic logic unit (ALU) operation.

5. The processor-implemented method of claim 4 further comprising executing the one or more control word templates that were modified, using compute elements from the 2D array of compute elements.

6. The processor-implemented method of claim 1 further comprising designating a temporal order for operational execution.

7. The processor-implemented method of claim 6 wherein the temporal order applies to the topological set of compute elements from the 2D array of compute elements.

8. The processor-implemented method of claim 6 further comprising customizing the one or more control word templates to include the temporal order that was designated.

9. The processor-implemented method of claim 8 further comprising storing the one or more control word templates for future use.

10. The processor-implemented method of claim 9 further comprising reusing the one or more control word templates that were stored.

11. The processor-implemented method of claim 10 further comprising modifying the one or more control word templates that were stored, based on an arithmetic logic unit (ALU) operation.

12. The processor-implemented method of claim 11 further comprising executing the one or more control word templates that were modified, using compute elements from the 2D array of compute elements.

13. The processor-implemented method of claim 1 wherein the specific set of compute element operations associated with the one or more control word templates include arithmetic logic unit (ALU) operations.

14. The processor-implemented method of claim 1 wherein the one or more control word templates enable program memory control word compression.

15. The processor-implemented method of claim 1 further comprising including an associative memory in each compute element of the topological set of compute elements from the 2D array of compute elements.

16. The processor-implemented method of claim 15 wherein the customizing is enabled by the associative memory.

17. The processor-implemented method of claim 16 wherein the associative memory provides a match between a control word tag and a compute element operation.

18. The processor-implemented method of claim 17 wherein the control word tag comprises a three-bit tag.

19. The processor-implemented method of claim 1 wherein the executing occurs on an architectural cycle basis.

20. The processor-implemented method of claim 19 wherein the architectural cycle basis reflects non-wall clock, compiler time.

21. The processor-implemented method of claim 1 wherein the one or more control word templates comprise wide, variable length, control words generated by the compiler.

22. The processor-implemented method of claim 1 wherein the designating the topological set of compute elements from the 2D array of compute elements includes placement and routing information.

23. A computer program product embodied in a non-transitory computer readable medium for task processing, the computer program product comprising code which causes one or more processors to perform operations of:
generating one or more control word templates for use in a two-dimensional (2D) array of compute elements, wherein each compute element within the 2D array of compute elements is known to a compiler and is coupled to neighboring compute elements of the compute element within the 2D array of compute elements, wherein tasks that are associated with processing operations are generated by the compiler, and wherein each control word template of the one or more control word templates designates a topological set of compute elements from the 2D array of compute elements;
customizing the one or more control word templates with a specific set of compute element operations that provide operational control for each compute element within the 2D array of compute elements; and
executing the specific set of compute element operations associated with the one or more control word templates on the topological set of compute elements from the 2D array of compute elements to process the tasks.

24. A computer system for task processing comprising:
a memory which stores instructions; and
one or more processors coupled to the memory, wherein the one or more processors, when executing the instructions which are stored, are configured to:
generate one or more control word templates for use in a two-dimensional (2D) array of compute elements, wherein each compute element within the 2D array of compute elements is known to a compiler and is coupled to neighboring compute elements of the compute element within the 2D array of compute elements, wherein tasks that are associated with processing operations are generated by the compiler, and wherein each control word template of the one or more control word templates designates a topological set of compute elements from the 2D array of compute elements;
customize the one or more control word templates with a specific set of compute element operations that provide operational control for each compute element within the 2D array of compute elements; and
execute the specific set of compute element operations associated with the one or more control word templates on the topological set of compute elements from the 2D array of compute elements to process the tasks.

* * * * *